United States Patent [19]
Suzuki et al.

[11] Patent Number: 5,088,966
[45] Date of Patent: Feb. 18, 1992

[54] TENSIONER HAVING PAD MADE OF PLASTICS

[75] Inventors: Tadasu Suzuki, Kawagoe; Atsushi Kumakura, Tokorozawa; Yuichi Futami, Iruma, all of Japan

[73] Assignee: Tsubakimoto Chain Co., Osaka, Japan

[21] Appl. No.: 604,912

[22] Filed: Oct. 29, 1990

[30] Foreign Application Priority Data

Oct. 27, 1989 [JP] Japan .............. 1-125105[U]

[51] Int. Cl.$^5$ .............................................. F16H 7/08
[52] U.S. Cl. ..................................................... 474/111
[58] Field of Search .......... 474/101, 109–111, 474/113–117, 133, 135, 136, 138

[56] References Cited

U.S. PATENT DOCUMENTS

| | | | |
|---|---|---|---|
| 3,812,733 | 5/1974 | Yoshida | 474/111 |
| 4,713,043 | 12/1987 | Biedermann | 474/111 |
| 4,874,352 | 10/1989 | Suzuki | 474/111 X |

FOREIGN PATENT DOCUMENTS

| | | | |
|---|---|---|---|
| 2525352 | 9/1976 | Fed. Rep. of Germany | 474/111 |
| 3325838 | 1/1985 | Fed. Rep. of Germany | 474/111 |
| 742092 | 12/1955 | United Kingdom | 474/111 |

*Primary Examiner*—Thuy M. Bui
*Attorney, Agent, or Firm*—Howson & Howson

[57] ABSTRACT

A tensioner for an endless power transmission chain or belt comprises a transmission-engaging element for directly contacting the transmission and applying tension thereto while permitting the transmission to move past the transmission-engaging element, a sliding element mounted for longitudinal movement along a line of movement extending toward the transmission-engaging element, a spring urging the sliding element along said line of movement in a direction toward the transmission-engaging element, and a pad made of plastics material, secured to an end of the sliding element and urged into engagement with the transmission-engaging element by the spring whereby the transmission-engaging element is urged against said transmission by the pad. The pad is mounted on a plate on the end of the sliding element, and secured to the plate by resilient engagement of the plate in an interior space or pocket of the pad, or by the engagement of molded projections of the pad with holes or recesses of the plate, or by press-fitting the sliding element into a hole in a plate received in an interior space within the pad.

16 Claims, 9 Drawing Sheets

TENSIONER HAVING PAD MADE OF PLASTICS

BRIEF SUMMARY OF THE INVENTION

This invention relates to tensioners, and in particular to an improved tensioner for applying suitable tension to an endless chain or belt used to transmit power between two or more rotating shafts.

It is conventional practice to apply a predetermined tension to a power transmission chain or belt in order to prevent skipping of sprocket teeth in the case of a chain or toothed belt, or to prevent slipping in the case of smooth belt. Typically, tension is applied by means of a conventional tensioner comprising a longitudinally movable, spring-loaded, metal element which projects outwardly from a housing and contacts a spherical rubber protrusion adhesively secured to a guide member. The guide member is pivoted for rocking motion and bears against the chain or belt to apply tension.

Since the protrusion is made of rubber, it is deficient in heat resistance and mechanical strength, and has a short useful life. Because it is secured to the guide by adhesive, the guide must be carefully cleaned before the adhesive is applied. Otherwise, the protrusion is liable to become detached from the guide.

Another form of tensioner, which avoids the problems of the rubber protrusion, comprises a spring-loaded metal element having a spherical end face which contacts the guide member directly. However, this form of tensioner is subject to another problem in that sliding metal-to-metal contact of the projection against the guide member produces objectionable noises.

The principal object of this invention is to provide a tensioner which has an improved useful life. Other objects of the invention include the avoidance of the need for adhesive attachment of elements of the tensioner, the elimination of the need for careful cleaning of elements before attachment, and the easy and secure attachment of the tensioner parts together. Still a further object of the invention is the avoidance of objectionable noises in the operation of the tensioner.

The present invention addresses these objects by providing a tensioner which comprises a housing, a cylindrical sleeve fitted for longitudinal sliding movement in the housing, means for urging the sleeve to project from the housing, a plate secured to an outer end of said sleeve, a pad made of plastics and held on said plate, and a guide member for being contacted by said pad to apply tension to the transmission belt or chain.

The pad held on the plate resiliently presses the guide member against the chain or belt to apply tension. Since the pad is made of plastics material, it is superior to rubber in heat resistance and mechanical strength, and is capable of use for a longer period of time. It also avoids noise generation, which occurs in tensioners having sliding metal-to-metal contact.

The pad can be mounted on the plate in various ways without reliance on adhesives. Accordingly it is not necessary to clean a mounting face on the guide member, or to deburr the guide member before attaching the pad. This simplifies the process of assembly of the tensioner.

The above and other objects, features and advantages of the invention will become apparent from the following description and the appended claims, taken in conjunction with the accompanying drawings, in which like members or elements are denoted by like reference numerals.

DETAILED DESCRIPTION

Figure 17:
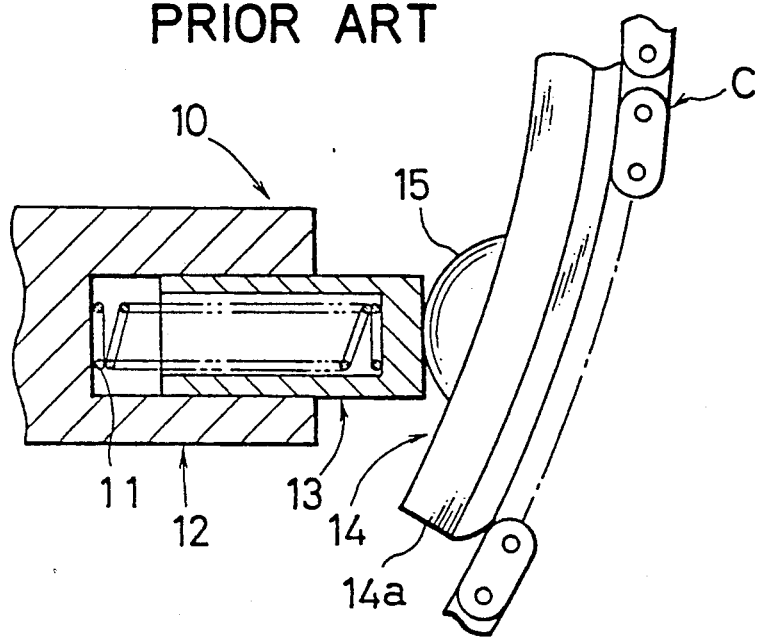
FIGS. 17 and 18 are sectional views showing tensioners in accordance with the prior art.

Referring first to FIG. 17, which shows an example of a conventional tensioner, the tensioner, generally indicated by reference numeral 10, comprises a housing 12 and a cylindrical metal sleeve 13 slidable longitudinally in, and guided by, a bore in the housing. The sleeve is normally urged by spring 11 in the outwardly projecting direction from the housing so that its outer end face contacts a arcuate convex rubber protrusion 15. Rubber protrusion 15 is typically spherical and is adhesively secured near a movable end 14a of an elongated, chain-engaging guide member 14. The guide member is mounted for rocking movement on a fixed pivot (not shown) near its opposite end, and is pressed, by sleeve 13, against chain C to apply a predetermined tension to the chain.

As mentioned previously, the rubber protrusion has a relatively short useful life due to its low resistance to heat and wear, and its low mechanical strength. In addition, attachment of the rubber protrusion to the guide is difficult and time-consuming because of the need for adhesive, and the need to clean the surface of the guide prior to application of the adhesive.

Figure 18:
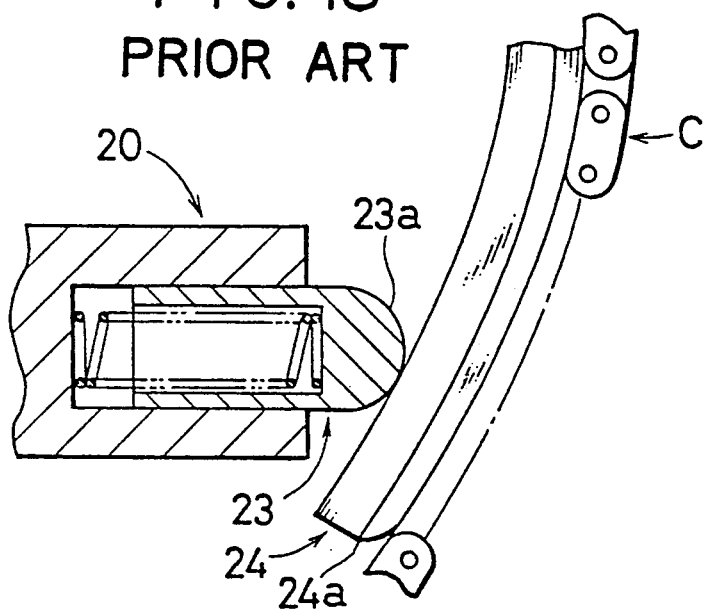

The tensioner 20 of FIG. 18, which is also conventional, comprises a metal sleeve 23 having an arcuate, rounded (typically spherical) end 23a which presses directly against pivoted guide member 24 near its free end 24a. Sliding metal-to-metal contact between sleeve 23a and guide member 24 causes undesirable noise.

Figure 4:
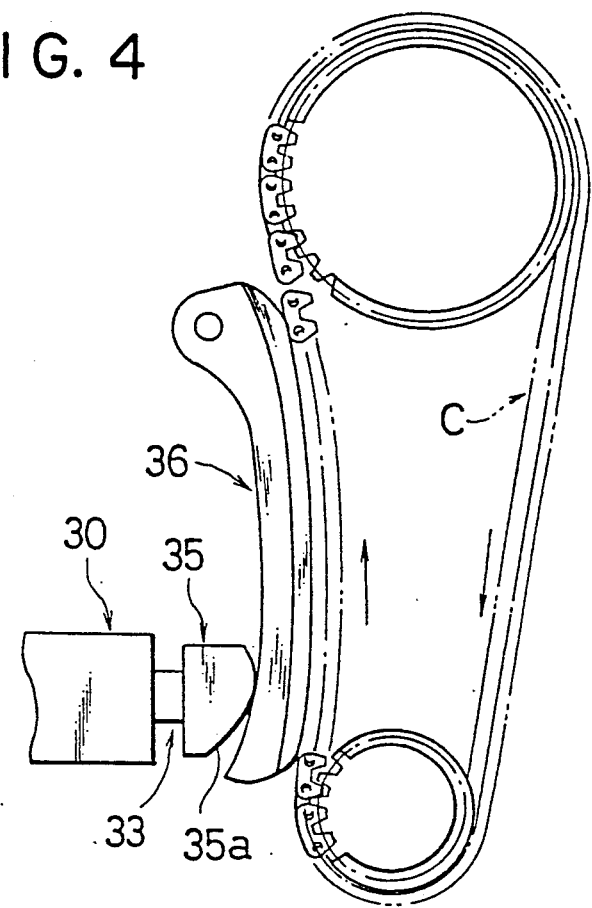
FIG. 4 is a schematic elevational view showing the operative relationship between the tensioner and chain of FIG. 1.

FIG. 4 shows a typical tensioner 30 in accordance with the invention. The tensioner includes a pad 35, which presses against a pivoted guide member 36 to cause the guide member to apply a predetermined tension to chain C. The chain may be used, for example, to operate the valves (not shown) of an automobile engine. The chain circulates clockwise around sprockets as indicated by the arrows in FIG. 4.

Figure 1:
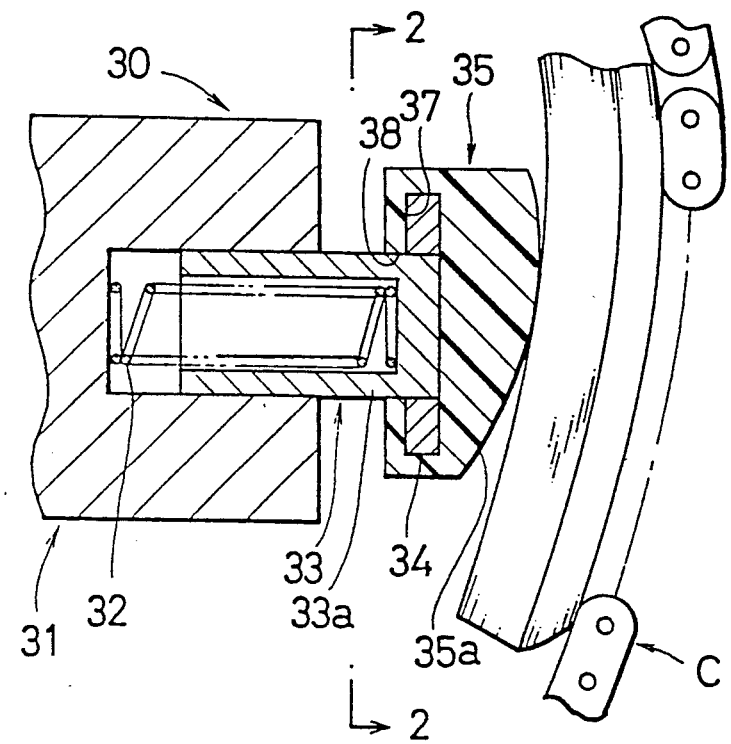
FIG. 1 is a fragmentary view of a chain having a tensioner in accordance with a first embodiment of the invention, with elements of the tensioner being shown in section.
Figure 2:
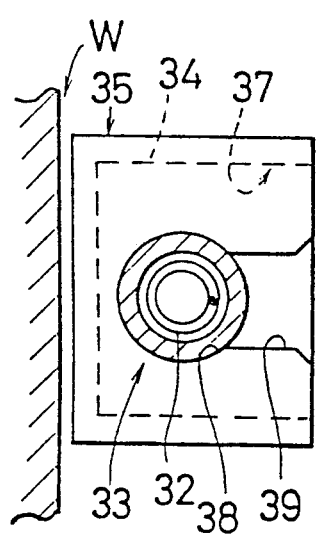
FIG. 2 is a vertical section taken on plane 2-2 of FIG. 1.
Figure 3:
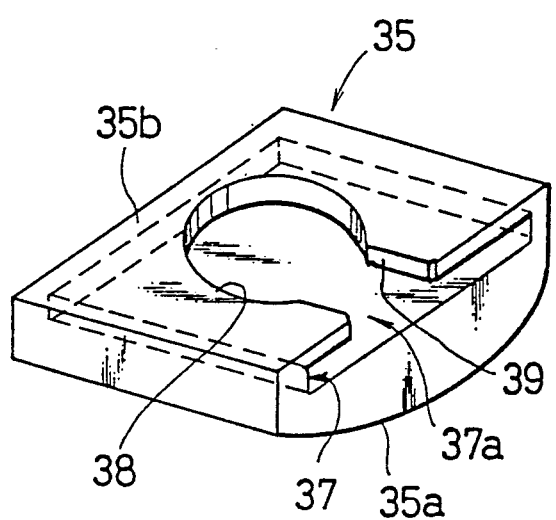
FIG. 3 is a perspective view of the pad of the tensioner of FIG. 1.

The tensioner is shown in more detail in FIGS. 1-3. A cylindrical sleeve 33 is longitudinally slidable in a bore in a housing 31, and guided thereby for movement, leftward and rightward, along a line of movement extending toward the pivoted transmission-engaging guide 36 (see FIG. 4). Spring 32, which is partly located inside sleeve 33, bears against the end of the blind internal bore in the sleeve, urging the sleeve rightward toward guide 36. A rectangular plate 34 is force fit on end 33a of the sleeve, and its parallel front and rear faces extend perpendicular to the line of movement of the sleeve.

Pad 35 is mounted on plate 34. The pad is made of a plastics material, preferably from a synthetic resin material such as an acetal resin (DELRIN), a polyamide (NYLON), polytetrafluoroethylene (TEFLON) and similar engineering plastics materials. The pad has an curved cylindrical face 34, preferably arcuate in form, which contacts the transmission-engaging guide member 36. Pad 35 has a rectangular opening 37a in one of its side faces, leading to a hollow interior space 37 which preferably conforms to the shape of plate 34. Hole 38 in the rear wall 35b of the pad receives sleeve 33, and the diameters of sleeve 33 and hole 38 are preferably the same so that the sleeve closely fits hole 38. A slot 39 extends from hole 38 to the edge of the rear wall. The width of the slot is slightly less than the diameter of hole 38, thereby forming, with hole 38, a keyhole-shaped opening. The portions of the rear wall adjacent to slot 39 are resilient, and give way to sleeve 33 when the pad is moved to cause plate 34 to enter interior space 37. The opening of slot 39 is preferably bevelled, as shown in FIGS. 2 and 3 to allow easy attachment of the pad to the plate.

In mounting pad 35 onto plate 34, the pad is moved to a condition in which its face 35a is directed toward guide member 36, and slot 39 is open horizontally, in the rightward direction as seen in FIG. 2. Plate 34 enters the interior space 37 of the pad by way of opening 37a, and sleeve 33 is forced into position in hole 38, by way of slot 39, against the resilient force exerted by the portions of wall 35b on both sides of the slot.

The pad 35, when mounted on plate 34 will not easily become accidentally detached, since, for detachment, it is necessary to overcome the resilient force of the elements of rear wall 35b on both sides of slot 39. However, further assurance against detachment of the pad from the plate can be provided by a barrier W (FIG. 2) located adjacent to the pad on the side thereof opposite to the side having the plate-receiving opening 37a. This barrier W may be in the form of a fixed wall provided, for example, by an engine block.

With the tensioner 30 constructed as described above, spring 32 resiliently urges the sleeve 32 toward power transmission chain C to press pad 35 against the free end portion 36a of the transmission-engaging guide 36. Accordingly, guide member 36 is resiliently pressed against the chain to apply suitable tension to the chain.

Figure 5:
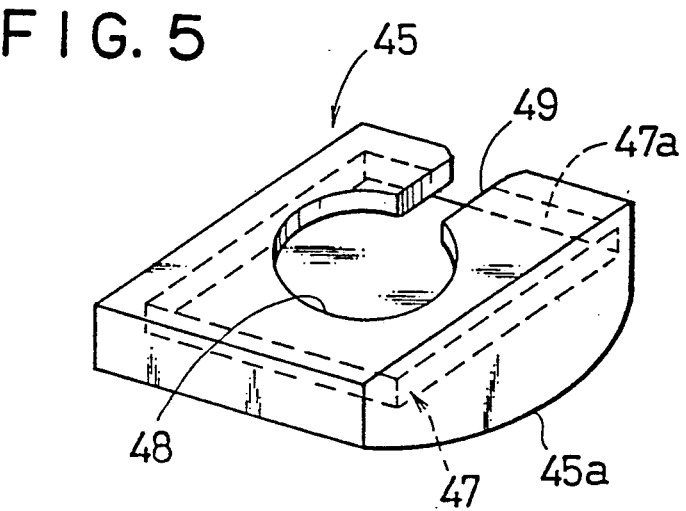
FIG. 5 is a perspective view showing an alternative pad which can be employed in the tensioner of FIG. 1.

FIG. 5 shows an alternative form of pad which can be used in the apparatus of FIGS. 1 and 4 in place of pad 35. Pad 45 is similar in shape and material to pad 35, but has a modified shape in that its interior space 47 is open at 47a on the trailing side of the pad relative to the direction of movement of the chain, and hole 48, which receives sleeve 33, is open, through slot 49, to the same trailing side of the pad. Guide member 36 has a cam surface engaged by the pad and configured to exert a force on the pad having a component in an upward direction perpendicular to said line of movement of sleeve 33. The trailing face of the pad to which the hollow interior space 47 is open at opening 47a, and to which slot 49 extends, faces in the direction of this upward component of force. Consequently, the reaction force exerted by the guide member on the pad opposes disengagement of the pad from the plate. The pad is also acted upon, through the guide member, by the force exerted on the guide member by reason of the clockwise circulating movement of the chain, in a direction opposite to the direction in which the pad is removable from the plate.

Figure 6:
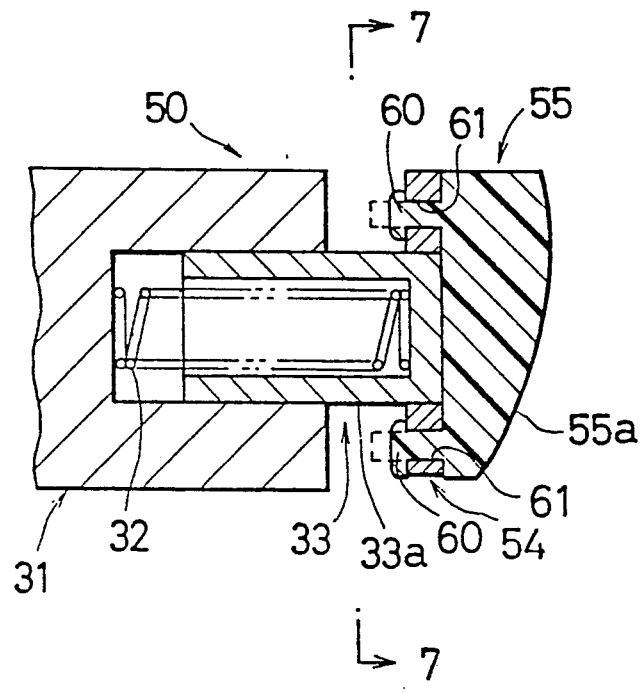
FIG. 6 is a sectional view illustrating a third alternative embodiment of the tensioner in accordance with the invention.
Figure 7:
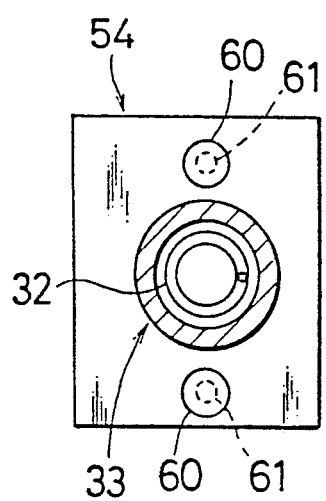
FIG. 7 is a vertical section taken on plane 7-7 of FIG. 6.
Figure 8:
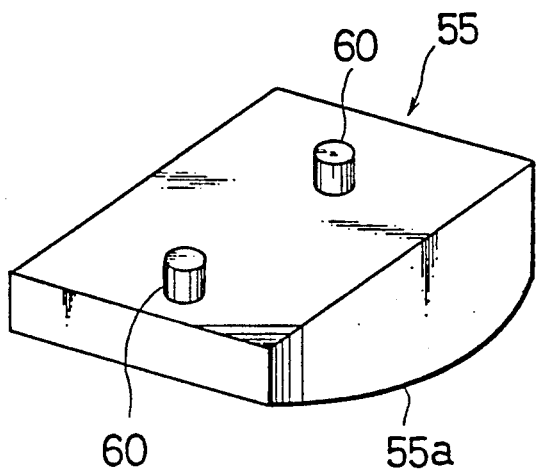
FIG. 8 is a perspective view of the pad of the tensioner of FIG. 6.

FIGS. 6-8 show another tensioner 50, which is generally similar in construction to tensioner 30 of FIG. 1, but different in that its pad 55 is mounted on a plate 54 in a different manner. Before it is mounted on plate 54, pad 55 has a pair of protrusions 60, which are molded as a unit with the pad. These protrusions are inserted into a pair of holes 61 formed in the plate. The protrusions are initially shaped as shown in solid lines in FIG. 8 and in broken lines in FIGS. 6 and 7. After the protrusions are inserted into holes 61, and the pad body is pressed up against the front face of the plate, the ends of the protrusions are fused by heat and pressed against the rear face of the plate as shown in solid lines in FIGS. 6 and 7.

Figure 9:
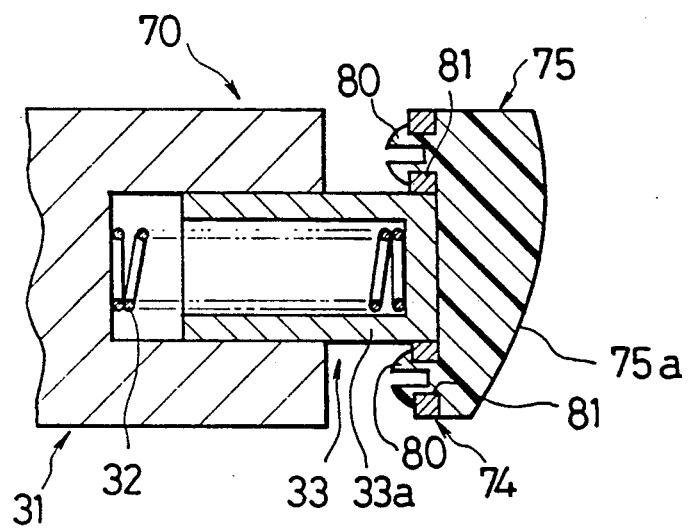
FIG. 9 is a sectional view illustrating a fourth alternative embodiment of the invention.

FIG. 9 shows a further tensioner 70 similar to that of FIGS. 6-8, except that the pad 75 is mounted onto a plate 74 by means of slotted projections 80, which snap into holes 81 in the plate. The expanded end of each of said projections is rounded, and projection has a slot, extending from its expanded end toward the pad body. The slot divides the projection into two parts, both of which are resilient and movable toward each other to permit the expanded end of the projection to move through the corresponding hole in the plate when the pad is attached to the plate. Consequently, the pad can be engaged with the plate by a snap fit.

Figure 10:
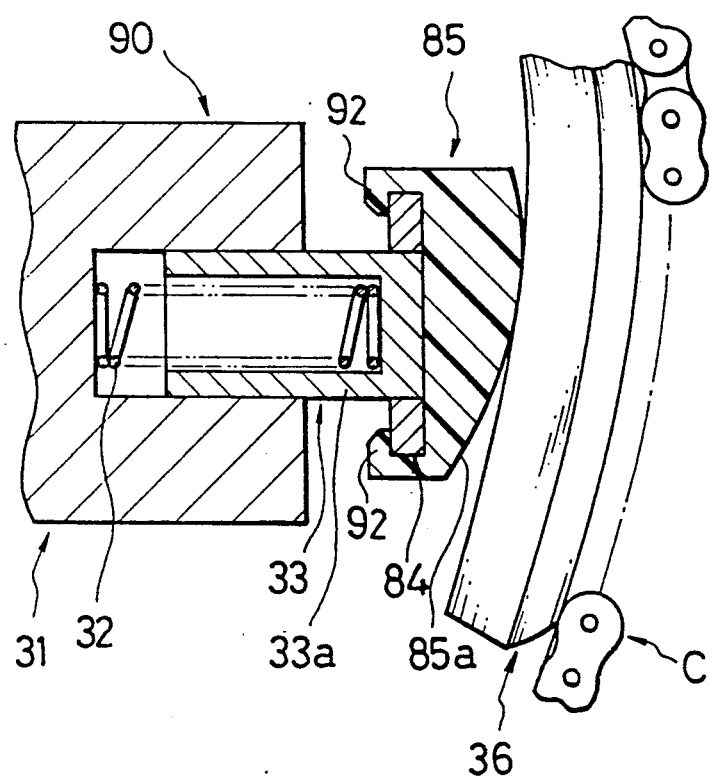
FIG. 10 is a sectional view illustration a fifth alternative embodiment of the invention.
Figure 11:
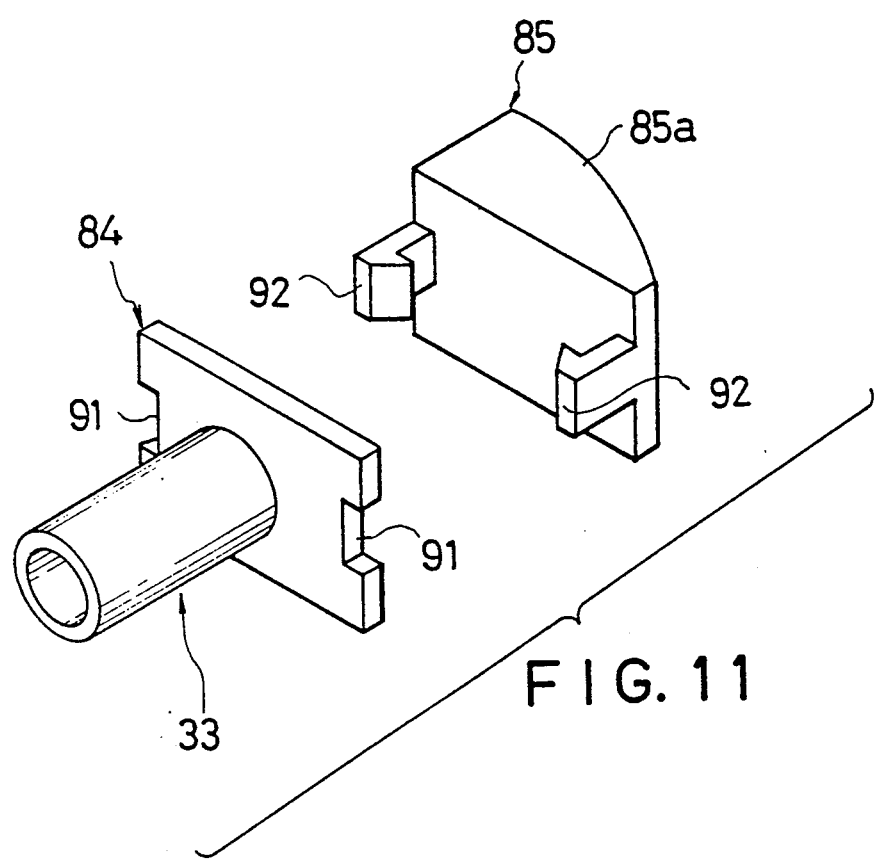
FIG. 11 is an exploded perspective view of the pad and plate of the tensioner of FIG. 10.

FIGS. 10 and 11 show a tensioner 90 comprising a pad 85 having a pair of resilient, pawl-shaped projections 92 molded as a unit with the pad. The projections extend through recesses 91 formed on opposite edges of pad mounting plate 84. The pad is held against sliding movement on the plate, by the engagement of the projections with the boundaries of the recesses. The projections have laterally extending parts bearing against the rear face of the plate and maintaining the pad body in contact with the front face of the plate. These laterally extending parts also have oblique cam faces, engageable with the edges of the plate at the locations of the recesses, when the pad body is being attached to said plate. The cam surfaces cause the resilient projections to flex outwardly, to permit the laterally extending parts of the projections to pass through the recesses and engage the plate by a snap fit.

Figure 12:
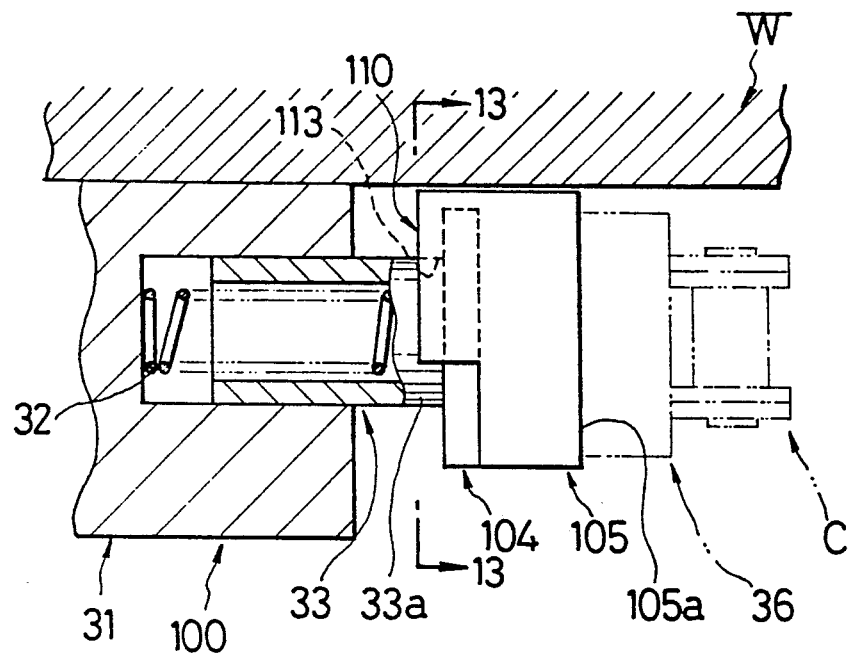
FIG. 12 is a horizontal section illustrating a sixth alternative embodiment of the invention.
Figure 13:
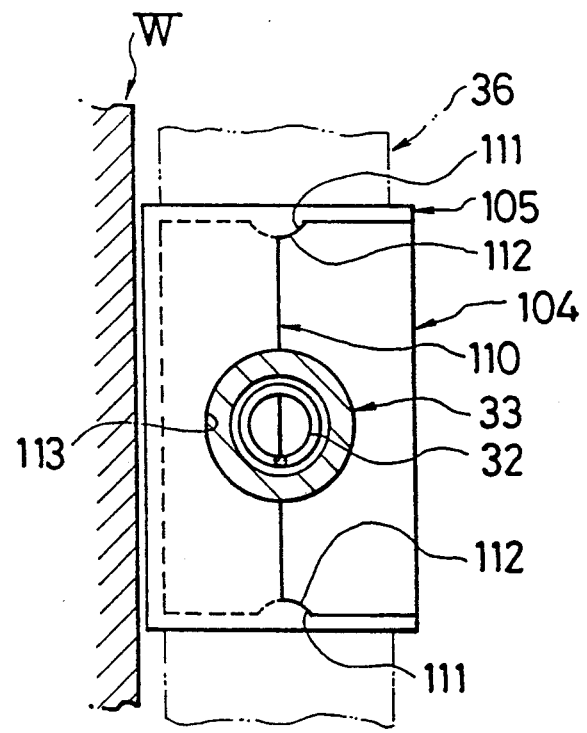
FIG. 13 is a vertical section taken on plane 13—13 of FIG. 12.
Figure 14:
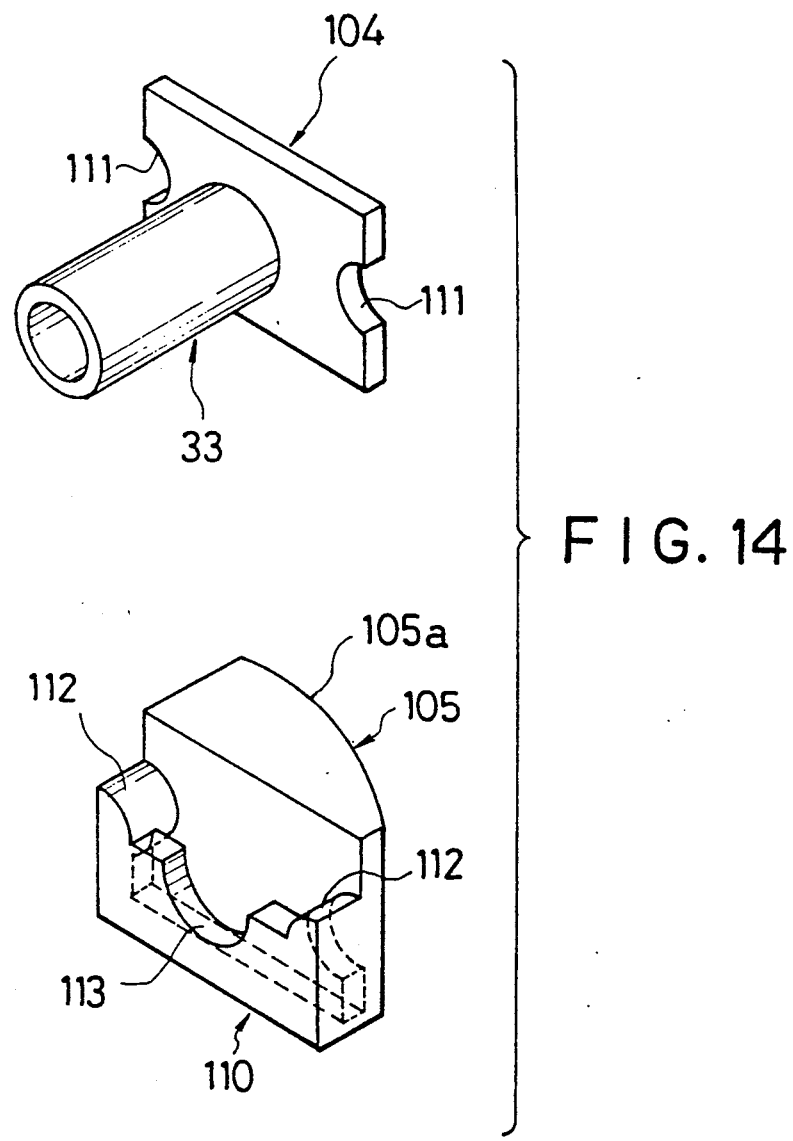
FIG. 14 is an exploded perspective view of the pad and plate of the tensioner of FIGS. 12 and 13.

FIGS. 12-14 show a tensioner 100 comprising a pad 105 mounted on a plate 104. The pad includes a unitary molded plate-receiving pocket 110 having a pair of arcuate, resilient protrusions 112 formed on opposite sides of the interior of the plate-receiving pocket. The protrusions 112 are engageable with arcuate recesses 111 formed on opposite edges of plate 104. The plate-receiving pocket 110 is bounded in part by a rear wall having an arcuate recess 113 formed therein for receiving sleeve 33. The engagement of recesses 111 with protrusions 112 holds the pad in engagement with the plate. The tensioner can be located adjacent to a barrier, e.g. a fixed wall W, as shown in FIGS. 12 and 13, with the barrier positioned on the side of the pad opposite to the side toward which the plate-receiving pocket is open. The barrier insures that the pad will not become accidentally disengaged from the plate.

Figure 15:
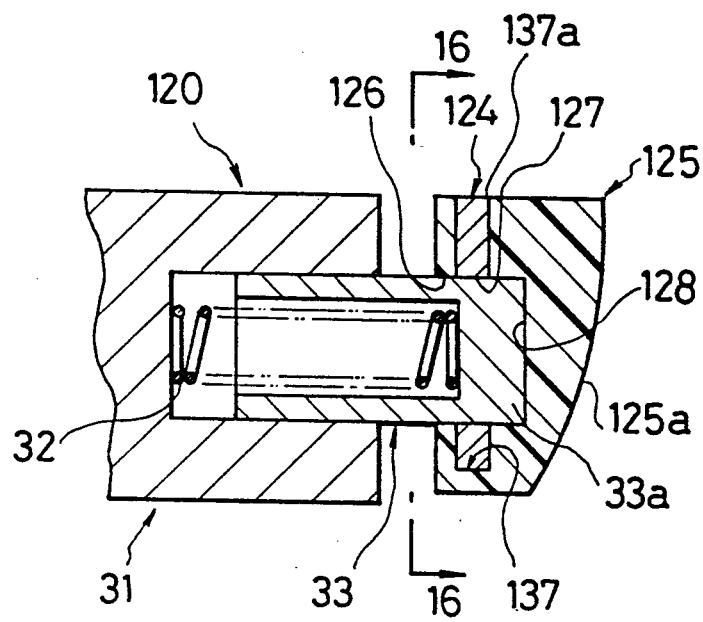
FIG. 15 is a sectional view illustrating a seventh embodiment of the invention.
Figure 16:
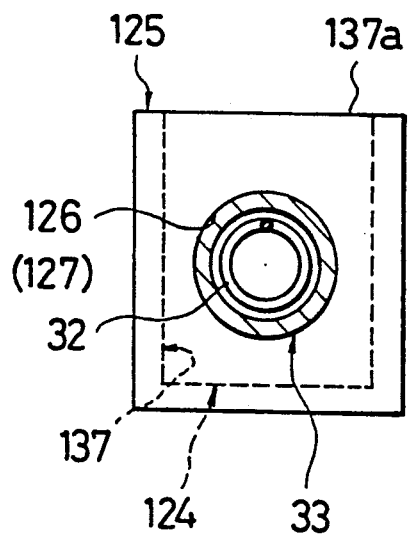
FIG. 16 is a vertical section taken on plane 16—16 of FIG. 15.

FIGS. 15 and 16 show a tensioner 120, which includes a pad 125. Pad 125 is similar to pad 45 of FIG. 5 in that its plate-receiving opening 137a is located on the top or trailing side of the pad as seen in FIGS. 15 and 16. There is no slot corresponding to slot 49 of FIG. 5. In mounting the pad on sleeve 33, a rectangular plate 124, which is not initially attached to sleeve 33, is first inserted through opening 137a into interior space 137 formed in the pad. The plate has a circular hole which is alignable with hole 126 in the rear wall of the pad. The end portion 33a of sleeve 33 is then inserted through hole 126 in the rear wall of the pad, and is force fit into hole 127 of the plate. The sleeve extends through hole 127 of the plate and its end portion 33a is then further force fit into a recess 128 formed in the interior of the pad and aligned with hole 126.

Pads 55, 75, 85, 105 and 125 are all made of a plastics material, and the faces 55a, 75a, 85a, 105a and 125a of the pads are all arranged to contact a guide member 36, so that there is no metal-to-metal sliding contact. The pads are highly heat-resistant and wear-resistant, are simple in structure, and can be easily and reliably mounted.

The invention having now been fully described, it will be apparent to those skilled in the art that the modifications described herein and many further changes and modifications can be made to the invention without departing from the spirit and scope of the invention as defined in the following claims.

We claim:

1. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having an end located near said transmission-engaging element; means urging said sliding element along said line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which the sliding element has a plate secured to said end located near the transmission-engaging element, the plate having front and rear faces, both substantially perpendicular to said line of movement, and in which said pad has a front face engageable with said transmission-engaging element, a rear face having an opening capable of receiving a portion of said sliding element, and a hollow interior space between said front and rear faces, said interior space having an opening facing in a lateral direction relative to said line of movement and being capable of receiving the plate so that the plate can be moved into said interior space through said opening, whereby said pad can be attached to said plate by sliding the plate into said interior space.

2. A tensioner according to claim 1 having resilient means on the pad for holding the pad in engagement with said plate.

3. A tensioner according to claim 1 in which said plate has a pair of opposite edges, each having a recess formed therein, and in which said interior space is bounded in part by a pair of opposed walls, said walls having resilient projections arranged to engage the recesses in said opposite edges of the plate, whereby the pad can be engaged with the plate by a snap fit.

4. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having an end located near said transmission-engaging element; means urging said sliding element along said line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which said sliding element has a plate secured to said end located near said transmission-engaging element, said plate having a front surface facing said transmission-engaging element and a rear surface facing away from said transmission-engaging element, said pad having a pad body engaged with said front surface of the plate and means, integrally formed with said pad body, engaged with said rear surface of the plate, and in which said pad body is held against the front surface of said plate by the engagement of said integrally formed means with said rear surface of the plate.

5. A tensioner according to claim 4 in which said pad has a slot arranged to receive said plate and resilient means for engaging said sliding element when the plate is received in said slot and for preventing accidental removal of said pad from said plate.

6. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having and end located near said transmission-engaging element; means urging said sliding element along said line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which the sliding element has a plate secured to said end located near the transmission-engaging element, the plate having front and rear faces, both substantially perpendicular to said line of movement, and in which said pad has a front face engageable with said transmission-engaging element, a rear face having an opening capable of receiving a portion of said sliding element, a side face extending from said front face of the pad to said rear face of the pad, a hollow interior space open to said side face, and a slot, in said rear face of the pad, extending from said opening to said side face, said slot being narrower than said portion of the sliding element received in said opening, and the portions of said rear face of the pad adjacent to said slot being sufficiently resilient to permit said pad to be attached to said plate by sliding the plate into said interior space while moving said sliding element through said slot through said opening.

7. A tensioner according to claim 6 in combination with an endless transmission means for transmitting power between a pair of shafts, in which said transmission-engaging element is in engagement with a portion of said transmission means extending between said shafts, and has a cam surface engaged by said pad and configured to exert a force on said pad having a component in a first direction perpendicular to said line of movement of the sliding element, and in which the side face of the pad to which said hollow interior space is open and to which said slot extends faces in the direction of said component of force, whereby said force opposes disengagement of the pad from the plate.

8. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having an end located near said transmission-engaging element; means urging said sliding element along said line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which the sliding element has a plate secured to said end located near the transmission-engaging element, the plate having front and rear faces, both substantially perpendicular to said line of movement, and in which said pad has a front face engageable with said transmission-engaging element, a rear face having an opening capable of receiving a portion of said sliding element, a side face extending from said front face of the pad to said rear face of the pad, a hollow interior space open to said side face, and a slot, in said rear face of the pad, extending from said opening to said side face, said slot being capable of receiving the sliding element so that the sliding element can be moved through said slot to said opening, whereby said pad can be attached to said plate by sliding the plate into said interior space while moving said sliding element through said slot toward said opening.

9. A tensioner according to claim 8 in combination with barrier means, located adjacent to said pad on a side thereof opposite to said side face, for preventing accidental removal of said pad from said plate.

10. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having an end located near said transmission-engaging element; means urging said sliding element along said line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which said sliding element has a plate secured to said end located near said transmission-engaging element, said plate having front and rear faces, and having at least two holes therein extending from said front face to said rear face, and in which said pad is a unitary molded structure including a pad body and at least two projections extending therefrom respectively through said holes in the plate and having expanded ends bearing against said rear face of the plate and maintaining said pad body in contact with said front face of the plate.

11. A tensioner according to claim 10 in which the expanded ends of said projections are formed by fusing said projections.

12. A tensioner according to claim 10 in which the expanded end of each of said projections is rounded, and in which each of said projections has a slot, extending from the expanded end of the projection toward the pad body, and dividing the projection into two parts, both of which are resilient and movable toward each other to permit the expanded ends of the projections to move through the holes in said plate when the pad is attached to the plate, whereby the pad can be engaged with the plate by a snap fit.

13. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having an end located near said transmission-engaging element; means urging said sliding element along said line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which said sliding element has a plate secured to said end located near said transmission-engaging element, said plate having a pair of recesses formed therein and having front and rear faces, and in which said pad is a unitary molded structure including a pad body and at least two resilient projections extending therefrom respectively through said recesses in the plate, said pad being held against sliding movement on said plate, by the engagement of said projections with the boundaries of said recesses, said projections having laterally extending parts bearing against said rear face of the plate and maintaining said pad body in contact with said front face of the plate, said laterally extending parts also having oblique cam faces, engageable with edges of the recesses, when the pad body is being attached to said plate, to cause the resilient projections to flex, thereby permitting the laterally extending parts of the projections to pass through the recesses and engage the plate by a snap fit.

14. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having an end located near said transmission-engaging element; means urging said sliding element along said line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which said sliding element has a plate secured to said end located near said transmission-engaging element, said plate having front and rear faces, and having at least two opposite edges, each of said edges having a recess formed therein, and in which said pad is a unitary molded structure including a pad body and at least two resilient projections extending therefrom respectively through said recesses in the edges of the plate, said pad being held against sliding movement on said plate, by the engagement of said projections with the boundaries of said recesses, said projections having laterally extending parts bearing against said rear face of the plate and maintaining said pad body in contact with said front face of the plate, said laterally extending parts also having oblique cam faces, engageable with the edges of the plate at the locations of said recesses, when the pad body is being attached to said plate, to cause the resilient projections to flex outwardly, thereby permitting the laterally extending parts of the projections to pass through the recesses and engage the plate by a snap fit.

15. A tensioner for applying tension to an endless power transmission in the form of a chain, belt or the like comprising: a transmission-engaging element for directly contacting said transmission and applying tension thereto while permitting said transmission to move past said transmission-engaging element; a sliding element mounted for longitudinal movement along a line of movement extending toward said transmission-engaging element, said sliding element having an end located near said transmission-engaging element; means urging said sliding element along a line of movement in a direction toward said transmission-engaging element; and a pad made of plastics, secured to said end of the sliding element and urged into engagement with said transmission-engaging element by said urging means whereby said transmission-engaging element is urged against said transmission by said pad, in which said pad has a front face engageable with said transmission-engaging element, a rear face having an opening capable of receiving a portion of said sliding element, and a hollow interior space between said front and rear faces, said interior space having a lateral opening facing in a lateral direction relative to said line of movement, and a metal plate located within said interior space and movable into said interior space through said lateral opening, said metal plate having a through hole aligned with said opening in the rear face of the pad, and the sliding element being press fit into said through hole.

16. A tensioner according to claim 15 in which said hollow interior space is bounded in part by front and rear walls, in which the front wall of said interior space has a recess aligned with said opening in the rear face, and in which said sliding element extends through said through hole in the metal plate and is press fit into said recess.

* * * * *

UNITED STATES PATENT AND TRADEMARK OFFICE
CERTIFICATE OF CORRECTION

PATENT NO. : 5,088,966

DATED : February 18, 1992

INVENTOR(S) : Suzuki, Kumakura, Futami

It is certified that error appears in the above-identified patent and that said Letters Patent is hereby corrected as shown below:

Column 6, line 62, Change "and" to --an--;

Column 7, line 19, change "through" to --toward--.

Signed and Sealed this

First Day of June, 1993

Attest:

MICHAEL K. KIRK

*Attesting Officer*     Acting Commissioner of Patents and Trademarks